United States Patent [19]

Clary

[11] 3,805,043

[45] Apr. 16, 1974

[54] SERIAL-PARALLEL BINARY MULTIPLICATION USING PAIRWISE ADDITION

[75] Inventor: James Barney Clary, Greensboro, N.C.

[73] Assignee: Bell Telephone Laboratories, Incorporated, Berkeley Heights, N.J.

[22] Filed: Oct. 11, 1972

[21] Appl. No.: 296,562

[52] U.S. Cl. .................................................. 235/164
[51] Int. Cl. .................................................. G06f 7/54
[58] Field of Search .................................................. 235/164

[56] References Cited

UNITED STATES PATENTS

| | | | |
|---|---|---|---|
| 3,456,098 | 7/1969 | Gomez et al. | 235/164 |
| 3,610,907 | 10/1971 | Taylor | 235/164 |
| 3,617,723 | 11/1971 | Melvin | 235/164 |
| 3,670,956 | 6/1972 | Calhoun | 235/164 |
| 3,627,999 | 12/1971 | Iverson | 235/164 |

OTHER PUBLICATIONS

R. K. Richards, Arithmetic Operations in Digital Computers, 1955, pp. 138–140 & 161–165

*Primary Examiner*—Malcolm A. Morrison
*Assistant Examiner*—David H. Malzahn
*Attorney, Agent, or Firm*—W. Ryan

[57] ABSTRACT

A serial-parallel two's complement binary multiplier circuit featuring a tightly clocked arrangement facilitating the formation of a product signal in an interval of duration shorter than the arrival interval for a serial multiplicand word. Hence, the multiplier circuit is capable of processing butted-word inputs in real time with only minor constraints on word formats. The multiplication algorithm features a pairwise summation of partial products on a least-significant-bit-first basis which gives rise to a tree-like structure of substantially identical circuit modules. Negative multiplicands are treated using a postmultiplication correction circuit.

12 Claims, 5 Drawing Figures

SERIAL-PARALLEL BINARY MULTIPLICATION USING PAIRWISE ADDITION

GOVERNMENT CONTRACT

The invention herein claimed was made in the course of or under a contract with the Department of the Navy.

FIELD OF THE INVENTION

This invention relates to digital data processing apparatus. More particularly, the present invention relates to apparatus and methods for generating digital signals representative of the product of digital signals representing a multiplicand and a multiplier. Still more particularly, the present invention relates to serial-parallel multiplier apparatus and methods for processing butted-word serial multiplicand data in real time.

BACKGROUND OF THE INVENTION

There are many applications in data processing which require the formation of a product signal. The data processing arts are replete with multiplication circuits and methods which are particularly adaptable for use in various of these contexts. Thus, for example, there are multiplier circuits which are particularly well adapted for performing the product of data signals from each of two serial data streams. In other applications, however, it is necessary to form the product of signals, one of which is presented in a serial data stream and the other of which is represented in parallel form. Such circuits are used in digital filtering, as described, for example, in Jackson, et al, "An Approach to the Implementation of Digital Filters," *IEEE Trans. on Audio and Electroacoustics*, Vol. AU–16, No. 3, September 1968.

An important requirement in many applications such as digital filtering is that all required multiplication operations relating to a given serial operand be performed within an interval no greater than that in which the serial operand is presented. If this is not so, then data cannot be processed in real time and some buffering or data interruption is required.

It is therefore an object of the present invention to provide apparatus and methods for generating product signals in real time for input operands, one of which is presented in serial format.

In general, a product signal contains a number of significant digits equal to the sum of the number of digits in each of the two operands. When cascaded multiplications are required (and for other reasons) it proves convenient to round off or truncate the product signals. It is an object of the present invention in such manner as to facilitate the truncation or rounding of results.

It has also been found to be advantageous to provide for the reclocking of results of a multiplication process. This reclocking is useful to insure that data are presented at various points in the circuit at substantially the same time. This is necessary because different components of a particular product may appear in a data-dependent manner at different times. Thus, before a second operation, for example, may be performed, it must be insured that all results from a first operation are complete or are at least at the same stage of processing. The use of reclocking flip-flops to achieve these goals is well known. However, the use of such reclocking flip-flops necessarily extends the required processing interval. It follows, of course, that additional apparatus must be provided in the form of the reclocking flip-flops and the associated interconnection and control leads.

It is therefore an object of the present invention to provide for a tightly clocked multiplication apparatus and method which minimize additional processing delays and increases in circuitry to achieve the tight reclocking.

Many attempts have been made to overcome the delays otherwise necessitated in the input data stream. In particular, it has been found that by processing the most significant bits of the parallel multiplier signal first, that the necessary additional delay may be introduced following the digit adders. A necessary disadvantage of such multipliers, however, is that it is not in general possible to process butted input words. This is so because the partial products corresponding to the most significant digits for a second word cannot be conveniently formed while the least significant partial products for a first word are yet to be completed.

It is therefore another object of the present invention to provide circuits and methods for forming the product of each of a sequence of butted serial multiplicands with a parallel multiplier.

SUMMARY OF THE INVENTION

The above and other objects are achieved in accordance with an illustrative embodiment of the present invention by providing that the partial products of each digit of the multiplication process be accumulated in a pairwise manner. The additions of the partial products are so ordered that the final sum is the desired product. It proves convenient to combine the partial products using a tree structure with adders in each branch of the tree.

In particular, it is a feature of the present invention that there is provided a circuit and method for performing multiplications of a serial multiplicand input word by a parallel multiplier word in a period not greater than that required to present the data portion of an input word plus $\log_2 M$ bit periods of reclocking delay, where $M = 2^m$ is the parallel multiplier word length, and $m$ is an integer. By including $\log_2 M$ parity or other non-data bits, or by introducing an equivalent delay, or by any combination of non-data bits and delay it is possible to process butted input words in real time.

It is another feature of the present invention that all digit adders are followed by reclocking flip-flops. It should be noted that the maximum of $\log_2 M$ bits of delay is always less than the M bits of delay usually required in fully reclocked multipliers.

BRIEF DESCRIPTION OF THE DRAWING

These and other features of the present invention will become more apparent upon a consideration of the following detailed description when read in connection with the attached drawing wherein.

DETAILED DESCRIPTION

Figure 1:
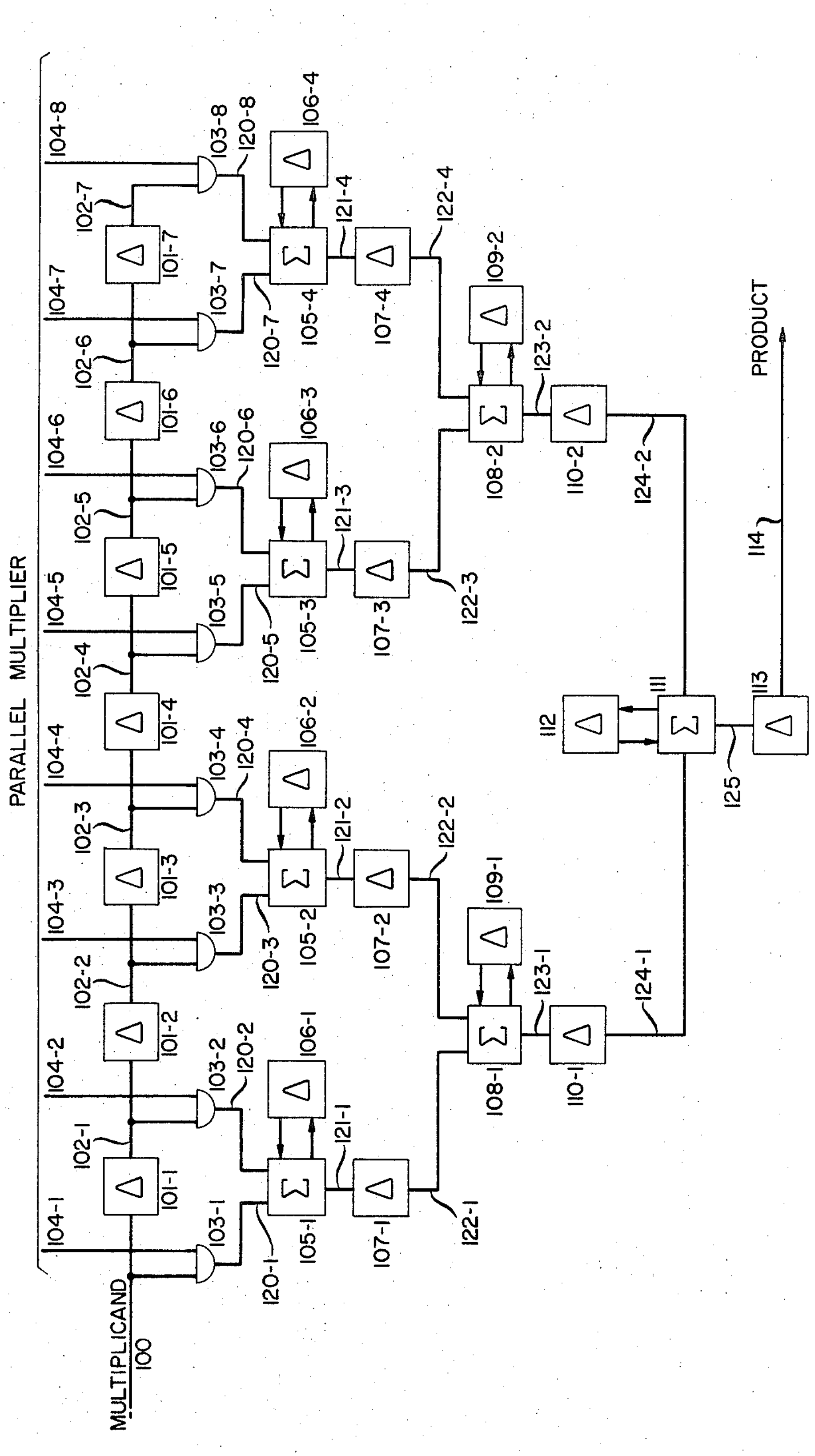
FIG. 1 shows a functional block diagram of a system for performing 2's complement serial-parallel multiplications for an 8-bit multiplier word in accordance with the instant invention.

The multiplication process performed by the present invention is best understood by considering a typical example. Thus, suppose that it is desired to form the product of A and B, where $A = a_6a_5a_4a_3a_2a_1$ and $B = b_4b_3b_2b_1$ are 6- and 4-bit binary words, respectively. $a_1$ is the least significant bit of the multiplicand A, and $b_1$ is the least significant bit of the multiplier B. It proves convenient to order the digits and form partial products as follows $$\begin{array}{ccccccccc}
a_1 & a_2 & a_3 & a_4 & a_5 & a_6 & & & \\
 & & b_4 & b_3 & b_2 & b_1 & & & \\
\hline
a_1b_1 & a_2b_1 & a_3b_1 & a_4b_1 & a_5b_1 & a_6b_1 & & & \\
 & a_1b_2 & a_2b_2 & a_3b_2 & a_4b_2 & a_5b_2 & a_6b_2 & & \\
 & & a_1b_3 & a_2b_3 & a_3b_3 & a_4b_3 & a_5b_3 & a_6b_3 & \\
 & & & a_1b_4 & a_2b_4 & a_3b_4 & a_4b_4 & a_5b_4 & a_6b_4 \\
\hline
P_1 & P_2 & P_3 & P_4 & P_5 & P_6 & P_7 & P_8 & P_9
\end{array}$$

The partial products shown are those usually found in the prior art, but their ordering is somewhat different than usual.

The pairwise addition in accordance with the present invention may be understood by considering each column of the partial product array and summing the terms in a pairwise manner. For example, neglecting carry-in terms for simplicity, $$P_4 = a_4b_1 + a_3b_2 + a_2b_3 + a_1b_4. \qquad (1)$$

This sum may equally well be represented as $$P_4 = S_1^4 + S_2^4 \qquad (2)$$

where superscripts denote column and subscripts denote (digit) partial product pair (from top to bottom of a column). Thus $$S_1^4 = a_4b_1 + a_3b_2 \qquad (3)$$

and $$S_2^4 = a_2b_3 + a_1b_4. \qquad (4)$$

The ordering of the multiplicand digits presented above corresponds to a least-significant-bit-first ordering of the multiplicand if digits are considered to be presented sequentially in a left-to-right manner. Since the serial multiplicand data is presented least significant bit first, proper carries are easily generated. For example, in the case of product term $P_4$, equation (2), two carries are possible. That is, $S_1^4$ may produce a carry, $C_1^4$, and $S_2^4$ may yield $C_2^4$. Assuming that $C_1^4$ and $C_2^4$ are non-zero, then $$P_5 = a_5b_1 + a_4b_2 + a_3b_3 + a_2b_4 + C_1^4 + C_2^4. \qquad (5)$$

Therefore, the proper carries are propagated from $P_4$ to $P_5$. In general, the carries, if any, are propagated to the next column to the right. When a carry occurs from the rightmost column, a new column is thereby created, as in the more usual creation of an additional leftmost column.

The complete "tree" of pairings, including carries, for the $j^{th}$ column ($j^{th}$ digit of the product) in an eight-bit by N-bit serial-parallel multiplier is as follows

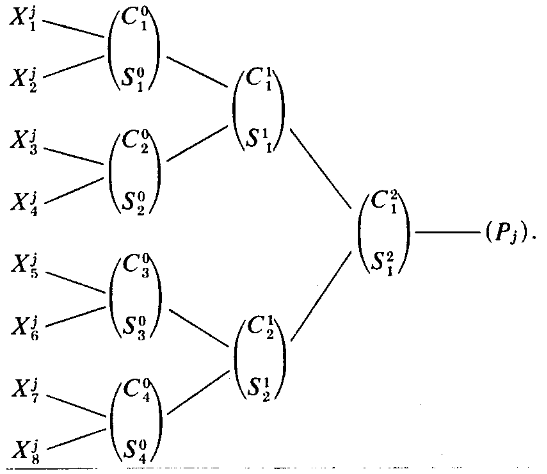

The overall system configuration for performing the pairwise summation of partial products in a serial-parallel multiplier in accordance with one embodiment of the present invention is shown in FIG. 1. A serial 2's complement multiplicand input word is presented (least significant bit first) on input lead 100. It proves convenient in some cases to delete and store the sign bit prior to applying the input word to lead 100. As the signal representing each bit of the multiplicand word is received on lead 100, the preceding bit signal is transferred by way of delay unit 101–1 to lead 102–1. For simplicity, "bit" and "bit signal" will be used interchangeably, with any required distinctions being supplied by the context. Upon the presentation of subsequent input bits on lead 100 a given bit is transferred to the right by way of successive delay units **101–*i* and leads 102–*i* ($i = 1,2, \ldots ,7$). Delay units 101–1 through 101–7** typically comprise a corresponding number of standard shift register stages.

As each input bit appears on input lead 100 and, subsequently, on the lead **102–*i*, it is impressed upon one of the AND gates 103–*i*, $i = 1,2 \ldots ,8$ as shown. Also presented as an input to the AND gates 103–*i* are corresponding input leads 104–*i*, $i = 1,2 \ldots ,8$. Each of the leads 104–i has applied to it a corresponding bit, $b_i$, in the desired parallel multiplier. This multiplier is, of course, represented by a multidigit, 8-bit in this case, binary signal. $b_1$ is the least significant bit and $b_8$ the most significant bit. Thus as each new bit is presented on input lead 100, there is formed at the output of gates 103–*i*** and signal representing the ANDing of a multiplier digit $b_i$ and a multiplicand digit. This ANDing amounts to a multiplication of the then-associated multiplicand and multiplier bits, i.e., the ANDing generates partial product signals.

Outputs from consecutive pairs of AND gates **103–*i* are applied to respective one bit adders 105–*i***, $i$ =

1,2,3,4. Delay units **106–*i*, $i = 1,2,3,4$, in combination with adders 105–*i* form the sum and carry signals for the input pairs of partial products. The delay units 106–*i* store the carry signals for use at the next addition. Thus adder 105–1, for example, forms the sum of signals appearing on leads 120–1 and 120–2 during the current bit input interval and the stored carry from delay unit 106–1, if any, from the previous interval. Any carry signal resulting from this summation is stored in delay unit 106–1 for use as an input during the immediately succeeding input interval. These sum signals are then delayed (reclocked) by delay units 107–*i*, $i= 1,2,3,4$, before being applied to the adder-delay unit combinations 108–*i*/109–*i*, $i = 1,2$. Thus the previously summed pairs of partial products are again summed by pairs. After being delayed (reclocked) by delay units 110–*i*, $i = 1,2$, these partial products, now having been twice summed by pairs, are again summed by pairs using the combination of adder 111 and delay unit 112. Finally, after again being delayed (reclocked) by a delay unit 113, a bit of the desired product appears on the output lead 114.**

As each multiplicand bit appears on input lead 100, the ANDing and 3-level pairwise summation of the resulting partial products is performed. For each 8-bit input (multiplicand) sequence this is, in general, a 16-bit product signal. It has been assumed that the carry flip-flops (delay units **106–*i*, 109–*i* and 112) are cleared before the first input bit is applied to lead 100.** This clearing must be repeated after each input word is processed. If no new multiplicand word is applied, this clearing will be accomplished as a matter of course by the shifting out of previous carries.

The delay units shown in FIG. 1 typically comprise flip-flop stages of standard design and the adders may assume any typical form. The individual components may assume the form of circuits illustrative of the prior art appearing in U.S. Pat. No. 3,670,956 issued June 20, 1972 to D. F. Calhoun. A compatible set of integrated circuit components which may be used for the adder, delay (flip-flop) and gate elements of FIG. 1 includes, respectively, Motorola codes MC1219, MC10131 and MC10102.

Figure 2:
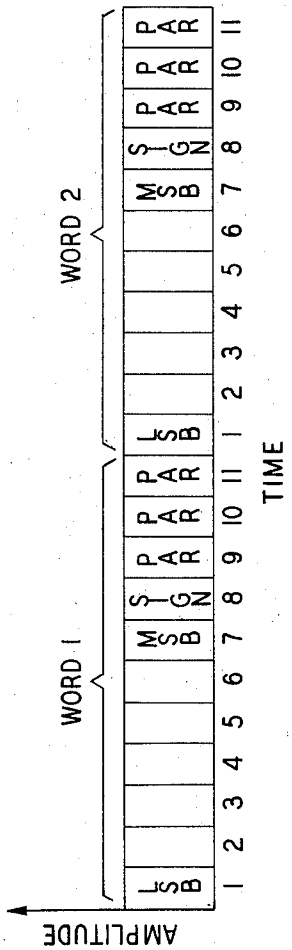
FIG. 2 shows the data format for a typical input (multiplicand) data word.

FIG. 2 shows a typical word format for use with a circuit of the type shown in FIG. 1. Here the serial multiplicand word contains a total of 11 bits, 8 of which are data bits. These data bits appear least-significant-bit-first and extent from time slot 1 through time slot 8. Time slots 9 through 11 are used to provide parity check bits. These latter bits do not, of course, become involved in the actual multiplication process. Typically, they are deleted before the word is applied at the input node. They do, however, supply all of the required inter-word spacing required by the present invention for an 8-bit serial multiplicand.

Figure 3:
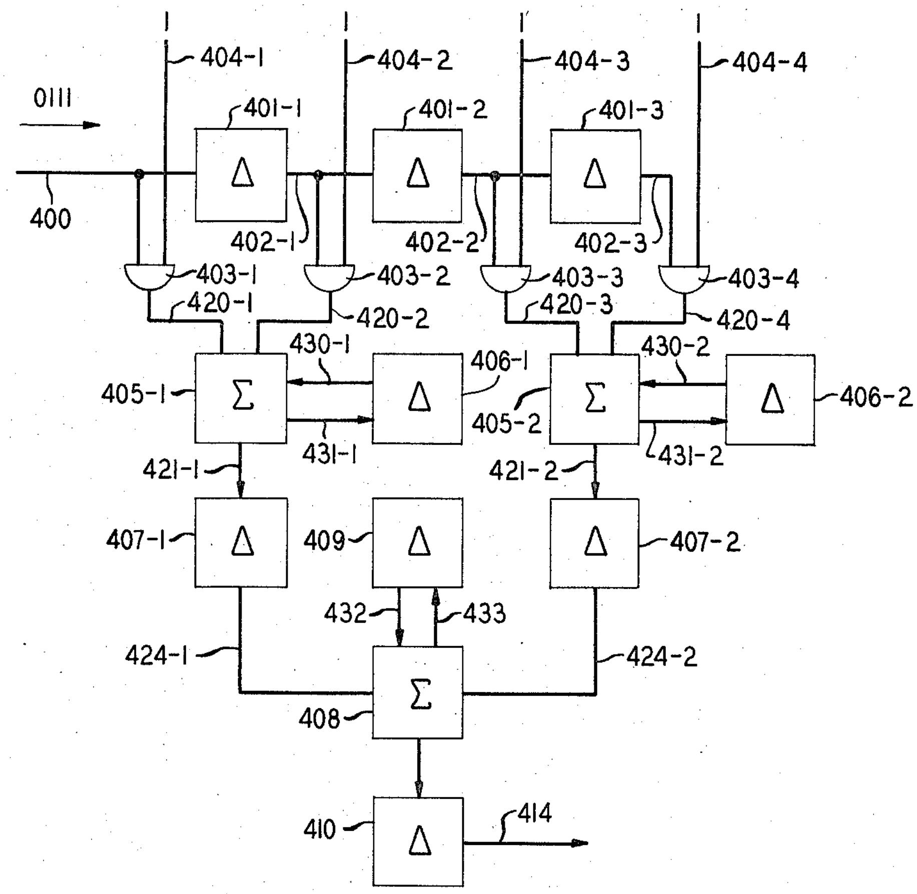
FIG. 3 shows a simplified version of the circuit of FIG. 1 for performing multiplications using a 4-bit multiplier word.

An example of the detailed operation of the multiplier circuit of the type shown in FIG. 1 will now be considered. For simplicity, however, only a 4-bit multiplier word will be treated. The appropriate circuits for this example are shown in FIG. 3; in each case the circuit elements are of the same type as corresponding elements in FIG. 1. Because of the "tree" structure of the circuitry used, the extension to permit the use of multiplier words having more digits will be obvious. In particular, the circuit of FIG. 1 represents an extension of the circuit of FIG. 3 by one additional hierarchical tree level.

Turning then to the circuit of FIG. 3, suppose it is desired to form the product of a positive multiplicand with magnitude 7 and a positive multiplier of magnitude 15. In 2's complement notation these operands are represented and the product formed by hand as

```
          0 1 1 1
    X    .1 1 1 1
    -------------
          0 1 1 1
        0 1 1 1
      0 1 1 1
    0 1 1 1
    -------------
    .1 1 0 1 0 0 1
```

Table I shows the step-by-step progress of the multiplication process in accordance with the present invention. Each of the circuit nodes is identified in the left-hand column and time proceeds from left to right. Thus the input node 400 has applied to it during time intervals 1 through 4 the multiplicand digit sequence, with the least significant bit first and the sign bit last. The multiplier word is presented in parallel on nodes **404–*i*, $i = 1,2,3,4$, the least significant multiplier bit being presented on lead 404–4.** For present purposes, it is assumed that the multiplier input signals are maintained on their respective nodes during the entire multiplication process. It is also assume tha all delay units (flip-flops) have been cleared prior to the beginning of the first time interval.

TABLE I

| | TIME | | | | | | | | |
|---|---|---|---|---|---|---|---|---|---|
| NODE | 1 | 2 | 3 | 4 | 5 | 6 | 7 | 8 | 9 |
| **400** | 1 | 1 | 1 | 0 | 0 | 0 | 0 | 0 | 0 |
| **404–1** | 1 | 1 | 1 | 1 | 1 | 1 | 1 | 1 | 1 |
| **420–1** | 1 | 1 | 1 | 0 | 0 | 0 | 0 | 0 | 0 |
| **402–1** | 0 | 1 | 1 | 1 | 0 | 0 | 0 | 0 | 0 |
| **404–2** | 1 | 1 | 1 | 1 | 1 | 1 | 1 | 1 | 1 |
| **420–2** | 0 | 1 | 1 | 1 | 0 | 0 | 0 | 0 | 0 |
| **430–1** | 0 | 0 | 1 | 1 | 1 | 0 | 0 | 0 | 0 |
| **421–1** | 1 | 0 | 1 | 0 | 1 | 0 | 0 | 0 | 0 |
| **431–1** | 0 | 1 | 1 | 1 | 0 | 0 | 0 | 0 | 0 |
| **424–1** | 0 | 1 | 0 | 1 | 0 | 1 | 0 | 0 | 0 |
| **402–2** | 0 | 0 | 1 | 1 | 1 | 0 | 0 | 0 | 0 |
| **404–3** | 1 | 1 | 1 | 1 | 1 | 1 | 1 | 1 | 1 |
| **420–3** | 0 | 0 | 1 | 1 | 1 | 0 | 0 | 0 | 0 |
| **402–3** | 0 | 0 | 0 | 1 | 1 | 1 | 0 | 0 | 0 |
| **404–4** | 1 | 1 | 1 | 1 | 1 | 1 | 1 | | 1 |
| **420–4** | 0 | 0 | 0 | 1 | 1 | 1 | 0 | 0 | 0 |
| **430–2** | 0 | 0 | 0 | 0 | 1 | 1 | 1 | 0 | 0 |
| **421–2** | 0 | 0 | 1 | 0 | 1 | 0 | 1 | 0 | 0 |
| **431–2** | 0 | 0 | 0 | 1 | 1 | 1 | 0 | 0 | 0 |
| **424–2** | 0 | 0 | 0 | 1 | 0 | 1 | 0 | 1 | 0 |
| **432** | 0 | 0 | 0 | 0 | 1 | 0 | 1 | 0 | 0 |
| **434** | 0 | 1 | 0 | 0 | 0 | 0 | 1 | 1 | 0 |
| **433** | 0 | 0 | 0 | 1 | 0 | 1 | 0 | 0 | 0 |
| **414** | 0 | 0 | 1 | 0 | 0 | 1 | 0 | 1 | 1 |

It can be seen that the interaction of the multiplicand and multiplier signals with the circuitry of FIG. 3 causes signals to be generated at nodes 420–1 through 420–4 which contribute to the value of a digit in the desired product. These partial digit products are then added in a pairwise manner by adders 405–1 and 405–2 with their respective carry storing flip-flops 406–1 and 406–2. The leads 431–1 and 431–2 pass carry signals generated in a current time interval to flip-flops 406–1 and 406–2, respectively. The leads 430–1 and 430–2, of course, supply signals to their respective adders, which signals are representative of carry signals generated during the previous time interval. The sum signals generated by adders 405–1 and 405–2, as appropriately delayed by reclocking flip-flops 407–1 and 407–2, are then added in a pairwise manner by adder 408 using the carry store flip-flop 409.

After reclocking by flip-flop 410, the desired product digits appear (least significant bit first) on lead 414. Because of the reclocking delays the first product digit appears during time interval 3. In general, the generation of the first product digit is delayed relative to the time of presentation of the last multiplicand digit by a number of digits given by $\log_2$ M. Again M is the number of bits in the parallel multiplier word. When this number is not an integer value, the next larger integer applies. The number of delays introduced in each case is equal to the number of hierarchical levels in the circuit tree. In those cases where circuit conditions are such as to permit the elimination of reclocking flip flops (as where adder and gate signals are precisely controlled) no such delay will be encountered.

One additional consideration relating to the formation of a product in 2's complement arithemtic is that relating to the treatment of negative valued operands. Thus, in particular, for the serial-parallel multiplier shown in FIGS. 1 and 3, an incorrect result will be obtained when the multiplicand has a negative sign. This error condition is symptomatic or all 2's complement multipliers and in no way indicates a failing of the present inventive circuit.

A number of techniques are available for avoiding or compensating for the error introduced in forming products involving negative 2's complement numbers. These are described, for example, in Richards, *Arithmetic Operations in Digital Computers*, D. Van Nostrand, Princeton, 1955, pp. 161–165; Flores, *The Logic of Computer Arithmetic*, Prentice-Hall, Inc., Englewood Cliffs, N.J., 1963, pp. 51–58; and U.S. Pat. No. 3,617,723 issued to Melvin on Nov. 2, 1971. Typical of the techniques for restoring the correct value to a 2's complement product involving negative operands is that of adding a correction factor to the final result, or, what is equivalent, to the individual partial products. One manner of introducing the appropriate correction factor is that involving a so-called "sign extension" or "sign stretching." To illustrate, consider the case of multiplying −13 (decimal) by +11 (decimal). In 2's complement notation, this problem and its uncorrected (and therefore incorrect) result may be represented by

```
             1 . 1 0 0 1 1
       X     0 . 0 1 0 1 1
             -------------
               1 1 0 0 1 1
             1 1 0 0 1 1
           0 0 0 0 0 0
         1 1 0 0 1 1
       0 0 0 0 0 0
     0 . 0 0 0 0 0
     ---------------------
     0 . 1 0 0 0 1 1 0 0 0 1
```

the correct product may be obtained by extending the multiplicand sign bit to include a number of digits equal to the number of digits in the multiplier. The present example may therefore be reformed, and the intermediate and final results modified as follows

```
1 1 1 1 1 1 .1 0 0 1 1
          0 .0 1 .0 1 1
-----------------------
1 .1 1 1 1 1  1 0 0 1 1
1 .1 1 1 1 1  0 0 1 1
0 .0 0 0 0 0  0 0 0
1 .1 1 1 0 0  1 1
0 .0 0 0 0 0  0
0 .0 0 0 0 0
-----------------------
1 .1 1 0 1 1  1 0 0 0 1
```

The portions of the partial product terms to the left of the "staircase" (known collectively as the sign extension array) are those contributed by the sign extension. In each case carries beyond the sign bit of the uncorrected product are ignored. It is the inclusion of these correction factors which gives rise to the final correct product.

While shown above as individual contributions to the partial products, the required correction factor could be added at the end of an uncorrected multiplication process. That is, by noting that the individual partial product "corrections" may be summed as

```
1 . 1 1 1 1
1 . 1 1 1
0 . 0 0
1 . 1
0 .
-----------
1 . 0 1 0 1
```

we may merely add 1.0101 to the uncorrected result. In some contexts, however, the formation of the single correction factor proves hindersome as, for example, by requiring additional memory capacity. Another aspect of the present invention is therefore to permit the required correction factors to be generated in a manner compatible with the circuitry of FIGS. 1 and 3 while simultaneously effecting a saving in required hardware. The particular apparatus and method used also permit the corrections to be made with a reduced amount of actual data manipulation.

Two characteristics of the sign extension array should be noted. First, the longest column is identical to the parallel arithmetic multiplier. Secondly, each of the other columns of the correction array is a consecutive subset of the multiplier word. To compute the value of the correction array, then, it is only necessary to serialize the parallel arithmetic multiplier, add succeeding terms to the sum of the preceding terms in the order indicated and propagate the carries. The resulting summer output is the desired correction factor.

Figure 4:
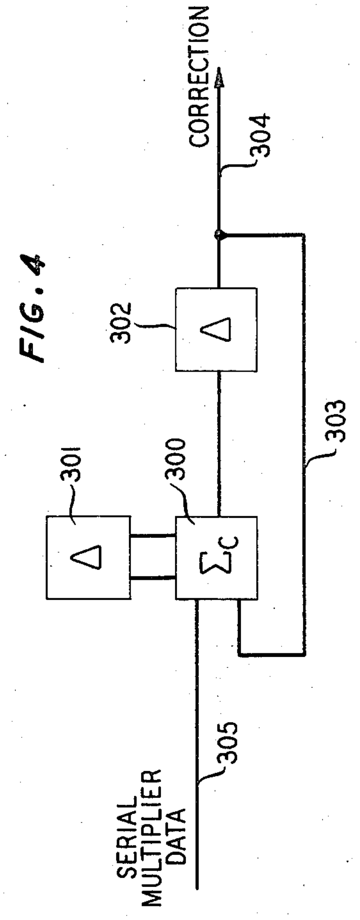
FIG. 4 shows a circuit for forming 2's complement postmultiplication correction factors for treating negative multiplicand numbers.

The correction may be computed quite easily using the circuit shown in FIG. 4.

The components in FIG. 4 include a 1-bit adder 300 and 1-bit delay units (flip-flops) 301 and 302. The serialized multiplier is presented, least significant bit first, on lead 305. Assuming flip-flops 301 and 302 to be initially cleared, the adder 300 passes the least significant bit through unchanged. After being delayed one time interval by delay unit 302, this digit appears on the output lead 304. This bit is then added to the appropriate uncorrected product bit produced on the output lead 114 of the circuit shown in FIG. 1. During succeeding intervals as successive multiplier data bits are applied on lead 305, there is generated in a straightforward manner the appropriate bit of the correction factor to be added to the corresponding uncorrected product bits.

Figure 5:
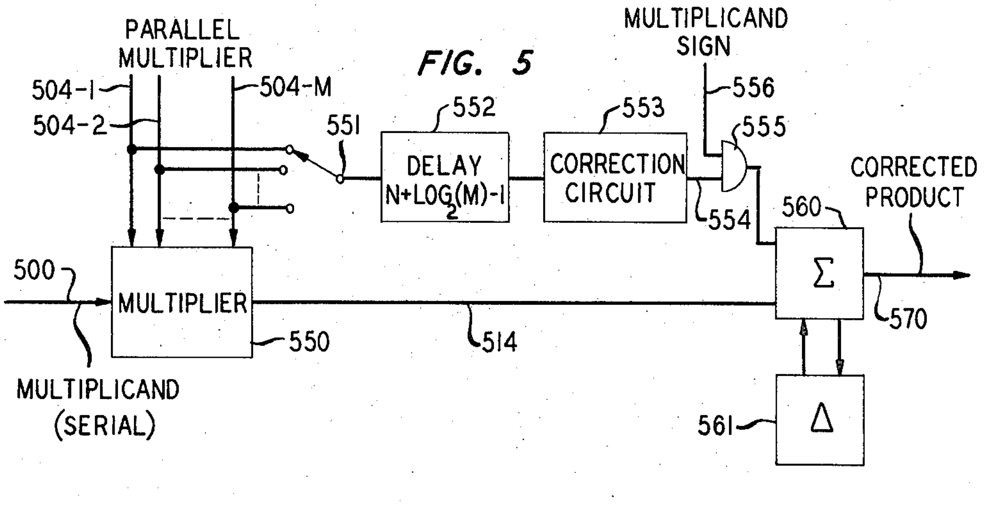
FIG. 5 shows the manner of combining the circuit of FIG. 4 with circuits of the form shown in FIGS. 1 and 3.

FIG. 5 shows the detailed manner of interconnecting the correction circuit of FIG. 4 to the multiplier circuit of FIG. 1 or FIG. 3. The serial multiplicand data are presented on lead 500 and the parallel multiplier signals are presented on leads 504–$i$, $i = 1,2, \ldots, M$. The multiplier 550 typically assumes the form shown in FIG. 1 or FIG. 3. As is obvious from the foregoing, the tree structure of these circuits is expanded in accordance with the number of digits in the multiplier word.

The uncorrected output from multiplier 550 appears on lead 514. To serialize the parallel multiplier data it proves convenient to use a scanner 551 (which is of standard design) to repetitively sample the signals appearing on the leads 504–$i$. The sampling proceeds in a repetitive manner beginning with the least significant bit, i.e., that appear on lead 504–1. The sampling period is, of course, one multiplicand bit interval. The serialized multiplier signals are then passed through delay unit 552 where they experience a serial delay equal to $N+\log_2(M)-1$ input bit intervals before being applied to correction circuit 553. This latter circuit, of course, assumes the form shown in FIG. 4. The N-bit component of the delay, where N is the number of multiplicand digits, is necessary because the only (uncorrected) product digits which require correction are those following the N least significant bits. See the example given above. The effect of the N-bit component of the delay can also be realized by merely starting the sampling of the multiplier digits N-bit intervals after the multiplicand is presented on the input to the multiplier.

The correction factor generated on lead 554 is then ANDed in gate 555 with a signal on lead 556 indicative of the sign of the multiplicand. Thus for a negative multiplicand a 1 appears on lead 556, causing the output from the correction circuit 553 to be passed on to the adder 560. Adder 560 and its associated carry flip-flop 561 are of standard design and typically will be similar to that used in the multiplier circuits of FIGS. 1 and 3. The uncorrected output signals on leads 514 are then summed with the correction circuit output appearing on lead 554 whenever a 1 signal appears on lead 556. In short, then, the correction signal is added to the uncorrected product signal to yield on lead 570 the desired corrected product signal.

When the multiplicand is positive (represented by a 0 bit) the correction signal developed in correction circuit 553 is inhibited from passing to adder 560 by the gate 555. Accordingly, no correction factor is added when the multiplicand is positive. As was noted above, the correction factor is only needed when the multiplicand is negative.

The appropriate timing which permits the correct digit of the correction signal to be summed with the corresponding digit in the uncorrected product signal is achieved by using the delay unit 552. In particular, it is necessary to account for the propagation delay through multiplier 550 for the appropriate uncorrected product bits. As was seen above, this propagation delay corresponds to the number of reclocking flip-flops following each bit adder in a top to bottom tree path plus the number of bits in the multiplicand. That is, in the case of the circuit of FIG. 1, the sum of the delay introduced by reclocking flip-flops 107–$i$, 110–$i$ and 113 plus the number of bits in the multiplicand. In the case of the circuit of FIG. 1, then, an (N+3)-bit delay interval is introduced, where N is the number of bits in the multiplicand. This may be effectively compensated for by introducing a corresponding delay in the formation of the correction signal. Since the correction circuit in FIG. 4 introduces a signal bit delay, there must be introduced by delay unit 552 or some equivalent means an additional delay equal to $N+\log_2(M)-1$, where $M$ is the number of digits in the multiplier.

In general an M-bit by N-bit multiplication yields an M + N bit product. If a sequence of multiplications are to be reformed, as is the case in typical digital filter or fast Fourier transform processing, the number of digits in a result will tend to grow. To keep this growth to manageable proportions and to permit a degree of uniformity of apparatus from stage to stage in the sequence of multiplications, it is common to truncate or round off the results of each multiplication.

As was shown in Table I, supra, the 4-bit by 3-bit multiplication yields a 7-bit product. It proves convenient in many applications of the present invention to truncate this 7-bit result by selecting only the four most significant bits. However, it is clear that the 4-bits to be retained are generated only after the fixed delay period of 2-bits and the period during which the three lowest order bits are formed have expired.

Numerous and varied other modifications and extensions of the present invention will occur to those skilled in the art. For example, although only the case of positive multipliers is treated, it is clear that correct results will obtain when negative multipliers are used as well. All that is required is a straightforward 2's complementing of the output results appearing on lead 570 whenever a negative multiplier is used. Similarly, although particular multiplier words having particular numbers of digits have been treated, it is clear that the multiplier may include an arbitrary number of digits. Similarly, multiplicands having an arbitrary number of digits may likewise be accommodated. To increase the allowed number of multiplier digits the circuits of FIGS. 1 and 3 may be expanded in a straightforward tree manner and the corresponding number of delay elements of the type identified in the circuit of FIG. 1 by the designations 101–$i$ increased. In general, for a multiplier of M digits, M−1 bits of such delay need be included. Other circuit elements of the type shown in FIG. 1 will be understood to be increased and interconnected in accordance with the well defined tree structure. As was mentioned above, the number of adder circuits identified in FIG. 1 by the designations 105–$i$ (and the corresponding number of reclocking flip-flops) will in general be equal to M−1 when M is an integer power of 2, i.e., when the "tree" is complete and symmetrical. In other cases the tree will be somewhat degenerate, but the number of cascaded adders in any top-to-bottom tree path for forming pairwise summations will be equal to the next integer larger than $\log_2$ M.

Although the present invention has been described in terms of fixed wired circuits, it will be clear to those skilled in the art that equivalent apparatus can be formed and processing performed using well-known program controlled machines.

What is claimed is:

1. Apparatus for forming signals representing the final product of a first set of digit signals occurring in time sequence during respective time intervals representing a multiplicand and a second set of digit signals present during each of said input intervals representing a multiplier comprising 1. first means for forming digit product signals corresponding to the product of each digit of said multiplicand and each digit of said multiplier,
2. second means for forming for each digit of said desired final product sum signals representing the sum of pairs of said digit product signals which contribute to said digit value of the desired final product signal, and
3. third means comprising means for iteratively forming cumulative sums of pairs of sum signals contributing to said digit value of the desired final product signal, said iterations being performed at a rate equal to one for each input time interval, said pairs of sum signals operated on by said third means at the first iteration being those formed by said second means, said pairs of sum signals operated on at subsequent iterations being those formed by said third means during the immediately preceding iteration.

2. Apparatus according to claim 1 wherein said third means further comprises means for increasing at each iteration said sum of pairs of sum signals by amounts representative of carry signals associated with one or more digits of lower significance in said desired final product.

3. Apparatus according to claim 1 wherein said third means comprises an array of substantially identical modules interconnected in a tree structure.

4. Apparatus according to claim 3 wherein each of said substantially identical modules comprises an adder for forming the sum of two-digit signals and carry signals.

5. Apparatus according to claim 4 wherein said tree structure comprises $N$ hierarchical levels where $N = \log_2 M-1$, and $M$ is the number of digits in said multiplier signal.

6. Apparatus according to claim 5 further comprising, in each identical module delay means associated with each adder for providing during each multiplicand input signal interval the result of the sum formed in said associated adder during the immediately preceding input interval.

7. Apparatus for generating a sequence of signals representing the product of an M-digit multiplicand and an N-digit multiplier, where said multiplicand and multiplier are represented respectively by M-digit and N-digit signals, comprising 1. N−1 ordered cascaded delay units, each having an input and an output,
2. means for applying consecutive digit signals of said M-digit multiplicand signal to the input of the first of said delay units during respective consecutive input time intervals,
3. N ordered AND circuits, each having a first and second input and an output,
4. means connecting the first input of the first N−1 of said AND circuits to the input of the corresponding one of said delay units, and means for connecting the first input of the Nth of said AND circuits to the output of the (N−1)th of said delay units,
5. means for simultaneously applying the ith digit signal of said N digit multiplier signal to the second input of the $i$th of said AND cricuits, $i = 1,2, \ldots ,N$,
6. an array of substantially identical modules each having two inputs and one output lead interconnected in a decreasing tree structure of ordered stages for iteratively summing in pairwise fashion the signals generated at the outputs of said N AND circuits, said array comprising N/2 modules at the first stage and one module at the last stage, the sequence of signals appearing on the output lead of said one module at said last stage being said product signal sequence.

8. Apparatus according to claim 7 wherein each of said modules comprises a three-input adder circuit for generating sum and carry signals, means for storing a carry signal generated by said adder during the immediately preceding input time interval, and means for applying said stored carry signal to one of said three inputs during a current input time interval.

9. Apparatus according to claim 8 wherein each of said modules further comprises means for applying said sum signals generated by said adder after a delay of one input time interval to one of said adders at the subsequent stage, said sum signals generated by said adder at said last stage being said signals representing said product.

10. Apparatus according to claim 8 further comprising correction means for forming a sequence of correction signals corresponding to the successive cumulative sums of the digits of said multiplier word, and means for selectively combining said correction signals with the output signals appearing on the output lead of said module at said last stage of said tree structure whenever said multiplicand has a negative sign thereby to generate a corrected product signal.

11. Apparatus for generating a corrected product signal resulting from the 2's complement multiplication of a multiplier and a multiplicand when said multiplicand has a negative sign comprising A. means for forming a sequence of signals corresponding to successive cuculative sums of the digit values of said multiplier, and B. means for bit-wise adding each of said cumulative sum signals to a corresponding bit signal of said uncorrected product.

12. Apparatus according to claim 11 wherein said means for forming comprises a three-input adder for generating sum and carry signals, means for sequentially applying to one input of said adder during consecutive time intervals signals representing consecutive multiplier digits, means for storing carry signals generated by said adder during the immediately preceding time interval and for applying said carry signals to a second input of said adder during the current interval, and means for applying to the third input of said adder during the current time interval a replica of the sum signal generated by said adder during the immediately preceding time interval.

* * * * *

UNITED STATES PATENT OFFICE
CERTIFICATE OF CORRECTION

Patent No. 3,805,043 Dated April 16, 1974

Inventor(s) James B. Clary

It is certified that error appears in the above-identified patent and that said Letters Patent are hereby corrected as shown below:

the assignee should read -- Bell Telephone Laboratories, Inc., Murray Hill, Berkeley Heights, N. J. --.

Column 4, line 52, change "lead" to --leads--; and
line 62, change "and" to --a--.

Column 5, line 48, change "extent" to --extend--.

Column 6, line 7, change "0111" to --0.111--;
line 29, change "assume tha" to --assumed that--;
line 46, change "404-4 1 1 1 1 1 1 1 1" to
--404-4 1 1 1 1 1 1 1 1--; and
line 51, change "434 0 1 0 0 0 0 1 1 0" to
--434 0 1 0 0 1 0 1 1 0--.

Column 8, line 2, delete the second decimal point.

Column 10, line 6, change "signal" to --single--.

Column 12, line 44, change "cuculative" to --cumulative--.

Signed and sealed this 3rd day of December 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.